US012610173B2

(12) United States Patent
Görtschacher et al.

(10) Patent No.: US 12,610,173 B2
(45) Date of Patent: Apr. 21, 2026

(54) CAPACITIVE EARBUD DETECTION IN AN EARBUD CHARGING CASE

(71) Applicant: NXP B.V., Eindhoven (NL)

(72) Inventors: Lukas Johann Görtschacher, Gratwein-Strassengel (AT); Erich Merlin, Gratkorn (AT)

(73) Assignee: NXP B.V., Eindhoven (NL)

( * ) Notice: Subject to any disclaimer, the term of this patent is extended or adjusted under 35 U.S.C. 154(b) by 173 days.

(21) Appl. No.: 18/606,884

(22) Filed: Mar. 15, 2024

(65) Prior Publication Data

US 2025/0294283 A1 Sep. 18, 2025

(51) Int. Cl.

*H04R 1/1025* (2026.01)
*H04R 1/02* (2006.01)
*H04R 1/10* (2006.01)

(52) U.S. Cl.

CPC ............. *H04R 1/1025* (2013.01); *H04R 1/02* (2013.01); *H04R 1/1016* (2013.01)

(58) Field of Classification Search

CPC ...... H04R 1/1025; H04R 1/02; H04R 1/1016; H04R 1/1041; H02J 7/0036; H02J 7/0044
See application file for complete search history.

(56) References Cited

U.S. PATENT DOCUMENTS 7,847,516 B2 12/2010 Kung et al.
11,445,282 B2 9/2022 Ding et al.
2019/0098390 A1 3/2019 Carino et al.
2019/0297408 A1* 9/2019 Mohammadi ........ H04R 1/1016
2020/0068285 A1* 2/2020 Dang ..................... H04R 1/028
2020/0213705 A1* 7/2020 Ding ..................... H02J 7/0045
2022/0124429 A1* 4/2022 Ruo ..................... H04R 1/1025

FOREIGN PATENT DOCUMENTS

DK 201970126 A1 3/2019

OTHER PUBLICATIONS

AN12999 NTAG 22x StatusDetect—Capacitive sensing guidelines; NXP Semiconductors; Revision 1.3, Mar. 23, 2022.
Corsca; "Application of TI Hall sensor in TWS headset—Smart Audio Glasses | TWS earbuds—Corsca"; Posted on Aug. 17, 2020; https://corsca.com/application-of-ti-hall-sensor-in-tws-headset/.

* cited by examiner

*Primary Examiner* — Jason R Kurr

(57) ABSTRACT

An earbud is provided having an earbud housing. Formed on a surface of the earbud housing are first and second conductive elements configured to form a first capacitive element. When the earbud is located within a charging case, the first and second conductive elements are arranged with a third conductive element mounted to an inside surface of the charging case in a location designed to influence a capacitance of the first and second conductive elements. An evaluation circuit of the earbud is positioned within the earbud housing and electrically coupled to the first and second conductive elements. In response to the first and second conductive elements having a capacitance value above a threshold, the evaluation circuit provides an indication the earbud is within the charging case. In another embodiment, a method is provided for detecting the earbud is within the charging case.

20 Claims, 4 Drawing Sheets

CAPACITIVE EARBUD DETECTION IN AN EARBUD CHARGING CASE

BACKGROUND

Field

This disclosure relates generally to electronic circuits, and more particularly, to capacitive earbud detection in an earbud charging case.

Related Art

Wireless earbuds are typically sold with a case that provides a place to store and charge the earbuds when not in use. The charging case may include docks that are shaped to fit the shape of the earbuds and include pogo pins that connect to contacts on the earbuds to provide for the charging. Some charging cases may charge the earbuds wirelessly, which allows for the elimination of mechanical connections via the pogo pins. An earbud charging case with a fully charged battery can typically charge a pair of earbuds several times. If the earbuds are inserted into a charging case with a depleted battery, no communication between the charging case and earbuds is possible. However, the earbuds may be active anyway via, for example, communication circuits such as audio or Bluetooth circuits because the earbuds do not detect that they are in the discharged charging case. This may result in batteries of the earbuds being completely discharged while in the discharged charging case.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
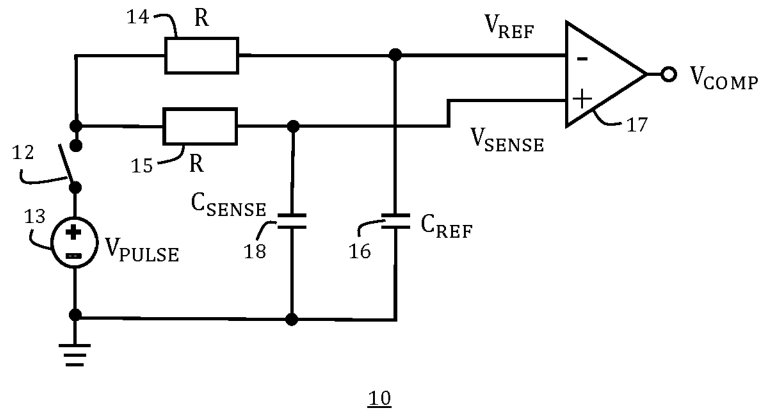
FIG. 1 illustrates a circuit diagram of an earbud detection circuit according to an embodiment.

Generally, there is provided, an earbud detection circuit for detecting when an earbud is inserted into its charging case, or cradle. The earbud detection circuit monitors the capacitance of a sensing capacitor to detect when the earbud is inside the charging case. This sensing capacitor is formed from conductive elements mounted on or in an earbud housing, case, or enclosure. The conductive elements may be formed from a metal or other conductive material. In one embodiment, the conductive element may be formed from metal sheets. A first conductive element of the sensing capacitor is conformally mounted on the surface of the earbud housing and coupled to a supply voltage. A second conductive element is also mounted on the earbud housing near the first conductive element to form the sensing capacitor. A third conductive element may be formed on the inside of the charging case and aligned with the first and second conductive sheets on the earbud when the earbud is fully inserted in the charging case. The third conductive element functions to contribute to the capacitance generated between the first and second conductive elements. The sensing capacitor, thus formed, is sensitive to the proximity of the third conductive sheet. Subsequently, in one embodiment, this capacitance, or charging state of the capacitor represented by a voltage level, may be compared to a reference value, and the result of the comparison used to discriminate between two different sensing states to indicate whether the earbud is in the charging case or outside the charging case. In another embodiment, a reference capacitor is not needed, instead, a discharge time of the sensing capacitance is measured to detect whether or not the earbud is in the charging case. If the earbud is determined to be in the charging case, then a circuit such as a communication circuit, audio circuit, or other circuit of the earbud is switched to a standby mode to avoid discharging the earbud's battery. In the described embodiments, it is the earbud that includes the detection circuit, not the charging case. In one embodiment, both earbuds of a pair of earbuds includes the sensing capacitor and detection circuit. These embodiments for sensing the earbud charging case allows for low power consumption and a low cost sensing operation, which is useful for battery powered systems. In other embodiments, the described capacitive sensing may be adapted to other applications, such as for example, pen applications, hearing aids, and devices that do not need to be active in the charging case.

In accordance with an embodiment, there is provided, an earbud including: an earbud housing; first and second conductive elements mounted to a surface of the earbud housing configured to form a first capacitive element, wherein when the earbud is located within a charging case, the first and second conductive elements are arranged with a third conductive element mounted to the charging case in a location designed to influence a capacitance of the first and second conductive elements; and an evaluation circuit positioned within the earbud housing and electrically coupled to the first and second conductive elements, wherein in response to the first and second conductive elements having a capacitance value above a threshold, the evaluation circuit providing an indication the earbud is within the charging case. The first, second, and third conductive elements may be metallic sheets attached to the surface of the earbud housing. The first conductive element may be selectively coupled to a supply voltage terminal, and the second conductive element may be coupled to a ground terminal. The evaluation circuit may include: a reference capacitor selectively coupled between the supply voltage terminal and the ground terminal; and a comparator having a first input coupled to the first capacitive element, a second input coupled to the reference capacitor, and an output for providing the indication the earbud is within the charging case in response to a voltage level representative of the capacitance value of the first capacitive element comparing favorably with a voltage level representative of a capacitance value of the reference capacitor. The earbud may further include a control circuit configured to connect the first capacitive element and the reference capacitor to the supply voltage terminal during a charging phase of operation, and the control circuit configured to disconnect the first capacitive element and the reference capacitor from the supply voltage terminal during a sensing phase of operation. The third conductive element may be formed in the charging case such that it is parallel with the first and second conductive elements when the earbud is positioned within the charging case. The evaluation circuit may further include: a comparator having a first input coupled to the first capacitive element, a second input coupled to receive a reference voltage, and an output; a control circuit configured to couple the first capacitive element to a supply voltage terminal during a capacitor charging phase, and after the capacitor charging phase, to begin a capacitance sensing phase, wherein a timer is started at the beginning of the capacitance sensing phase, and the timer is stopped when a voltage of the first capacitive element drops below the reference voltage, wherein a measured time between starting and stopping the timer is proportional to a capacitance value of the first capacitive element, and wherein the measured time being above a threshold time provides an indication the earbud is within the charging case. The earbud may further include a resistor connected in series with the first capacitive element. A circuit of the earbud may be switched into a standby mode in response to detecting the earbud is within the charging case and the battery is depleted.

In another embodiment, there is provided, a method for detecting an earbud is within a charging case, the method including: inserting the earbud into the charging case, wherein when the earbud is fully within the charging case first and second conductive elements formed on a surface of the earbud align with a third conductive element formed on a surface of the charging case; detecting, by an evaluation circuit in the earbud, a capacitance value between the first, second, and third conductive elements; determining that the earbud is within the charging case when the capacitance value is above a threshold; and providing an indication the earbud is within the charging case when the capacitance value is above the threshold. The method may further include switching the earbud into a standby mode in response to detecting the earbud is within the charging case and the battery is depleted. The method may further include switching the earbud into a standby mode a predetermined time after determining that the earbud is within the charging case and no communication with the charging case is detected. Determining that the earbud is within the charging case may further include determining that the earbud is within the charging case when the capacitance value of the first capacitive element is higher than a capacitance value of a reference capacitor. The method may further include: charging the first capacitive element during a charging phase; sensing a capacitance value of the first capacitive element during a sensing phase, the sensing phase following the charging phase; and measuring a time between starting the sensing phase and when a voltage across the first capacitive element drops below a reference voltage, wherein when the measured time is above a threshold time, an indication is provided that the earbud is within the charging case.

In yet another embodiment, there is provided, an integrated circuit including: a supply voltage terminal coupled to receive a supply voltage; a switch having a first terminal coupled to the supply voltage terminal, a second terminal, and a control terminal; a comparator having a first input terminal coupled to receive a reference voltage, a second input terminal coupled to a capacitive element formed from first and second conductive elements formed on a surface of an earbud housing, and the comparator having an output terminal, wherein the first and second conductive elements are aligned with a third conductive element formed on an inside of a charging case when the earbud is inserted into the charging case, and wherein the first conductive element is coupled to the second terminal of the switch, and the second conductive element is coupled to the ground terminal; and a control circuit coupled to the control terminal of the switch, wherein the control circuit causes the switch to close and charge the capacitive element during a charging phase, wherein the control circuit causes the switch to close during a sensing phase following the charging phase, and wherein, during the sensing phase, the output terminal of the comparator provides an indication the earbud is within the charging case when a voltage level of the capacitive element is above the reference voltage. The reference voltage may be provided by a reference capacitor formed on the integrated circuit. The earbud may be switched into a standby mode in response to detecting the earbud is within the charging case. The control circuit may further include a timer, wherein the timer is started at the beginning of the sensing phase, and the timer is stopped when a voltage at the capacitive element drops below the reference voltage, wherein a measured time between starting and stopping the timer is proportional to a capacitance value of the capacitive element, and wherein the measured time being above a threshold time provides an indication the earbud is inserted within the charging case. The first, second, and third conductive elements may be metallic sheets. The integrated circuit may further include an additional capacitor connected in parallel with the capacitive element external to the integrated circuit.

FIG. 1 illustrates a circuit diagram of an earbud detection circuit 10 in accordance with an embodiment. Earbud detection circuit 10 includes switch 12, voltage source 13, resistors 14 and 15, reference capacitor 16, comparator 17 and sensing capacitor 18. Sensing capacitor 18 is formed on a surface of an earbud (see FIG. 5) using first and second conductive elements corresponding to plates of a capacitor. In one embodiment, the first and second conductive elements may be metal sheets. One plate of sensing capacitor 18 is connected to a first terminal of switch 12 via resistor 15, and the other plate is coupled to a ground terminal. Also, a third conductive element is formed in the charging case and positioned to influence and increase the capacitance generated between the first and second conductive elements. In one embodiment, the other components, besides sensing capacitor 18 of earbud detection circuit 10, are implemented in hardware on an integrated circuit (IC) inside the earbud housing.

The earbud localization procedure can be divided into two phases, a capacitance charging phase (phase 1) and a capacitance sensing phase (phase 2). During phase 1, switch 12 is closed and an integrated circuit (IC) internal voltage source 13 provides a voltage labeled "$V_{pulse}$" to fully charge capacitors 16 and 18 to the same voltage via charging resistors 14 and 15. The resistance of resistors 14 and 15 is labeled R. In another embodiment, resistors 14 and 15 may have different resistances. Resistance R also defines the leakage current in this embodiment. During a sensing phase (phase 2), switch 12 is opened, and both capacitors 16 and 18 are discharged according to their time constants $R \cdot C_{sense}$ and $R \cdot C_{ref}$, respectively. Consequently, capacitance $C_{sense}$ of capacitor 18 and capacitance $C_{ref}$ of capacitor 16 are indirectly compared by means of their respective voltage levels using comparator 17. Subsequently, the comparator output $V_{comp}$ indicates the earbud is inside the charging case if a magnitude of voltage $V_{sense}$ is greater than voltage $V_{ref}$, and indicates the earbud is outside the charging case if a magnitude of voltage $V_{sense}$ is less voltage $V_{ref}$.

If the earbud is determined to be in the charging case, then a communication circuit of the earbud, e.g., Bluetooth or an audio circuit, may be switched to a standby mode to avoid discharging the earbud's battery. If the battery of the charging case is not discharged, then the charging case can cause the battery charging circuits of the earbud to be activated for battery charging.

Figure 2:
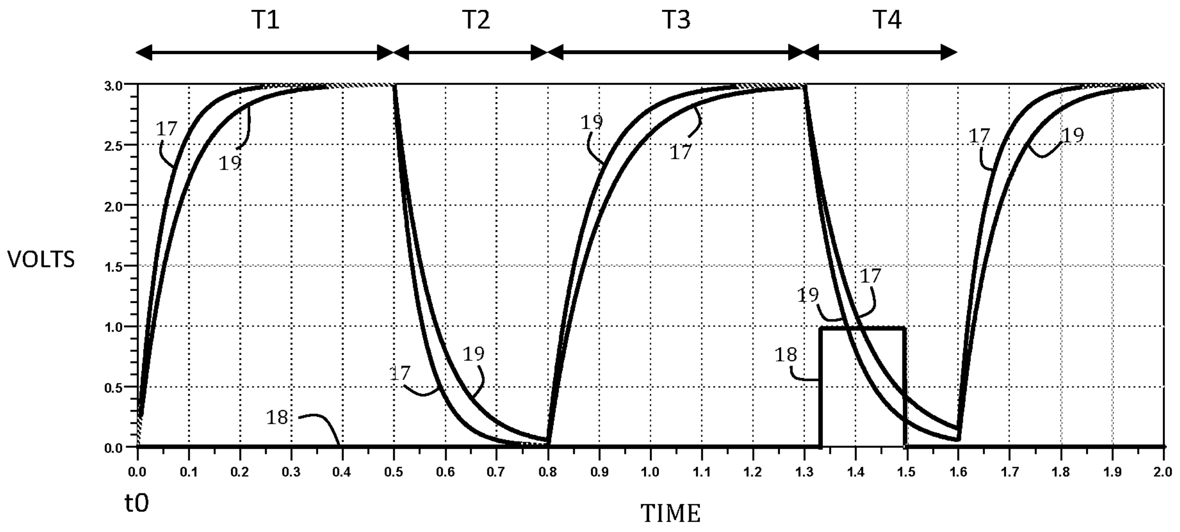
FIG. 2 illustrates a timing diagram of various signals during operation of the earbud detection circuit of FIG. 1.

FIG. 2 illustrates a timing diagram of various signals during operation of earbud detection circuit 10 of FIG. 1. In FIG. 2 the voltage levels of $V_{sense}$, $V_{ref}$ and $V_{comp}$ are plotted over time. In FIG. 2, voltage $V_{sense}$ is represented by curve 17, voltage $V_{ref}$ is represented by curve 19, and voltage $V_{comp}$ is represented by curve 18. At time t=0, the earbud is outside the charging case, meaning that capacitance $C_{sense}$ is less than capacitance $C_{ref}$. FIG. 2 illustrates two detection cycles. A first detection cycle includes time periods T1 and T2, and a second detection cycle includes time periods T3 and T4. Time periods T1 and T3 are charging time periods and time periods T2 and T4 are sensing time periods. Referring to both FIG. 1 and FIG. 2, during time period T1, voltage $V_{pulse}$ is high and capacitors 16 and 18 are charged to 3 volts through similar resistors 14 and 15 having resistance R. During time period T2, voltage $V_{pulse}$ is disconnected by switch 12 being opened, and both capacitors 16 and 18 are discharged via a leakage current to ground. In time period T2, voltage $V_{sense}$ 17 stays below voltage $V_{ref}$ 19, and consequently also voltage $V_{comp}$ 18 from comparator 17 stays low, indicating that the earbud is not in the charging case. Time period T3 starts another detection cycle. During charging time period T3, again switch 12 is closed and capacitors 16 and 18 are charged to 3 V. At time period T3, beginning at time t=0.8 ms, capacitance $C_{sense}$ is increased above capacitance $C_{ref}$, and a corresponding voltage increase indicates that the earbud is in the charging case. Next, during sensing time period T4, switch 12 is opened, capacitors 16 and 18 begin to discharge. Voltage $V_{sense}$ 17 stays above voltage $V_{ref}$ 18, and voltage $V_{comp}$ 18 provided by comparator 17 goes high, indicating that the earbud is located within the charging case. In this example $V_{comp}$ goes high because the magnitude of voltage $V_{sense}$ is greater than voltage $V_{ref}$. Note that in one embodiment, a safety margin, such as, e.g., 0.2 volts, may be added to voltage $V_{ref}$.

Figure 3:
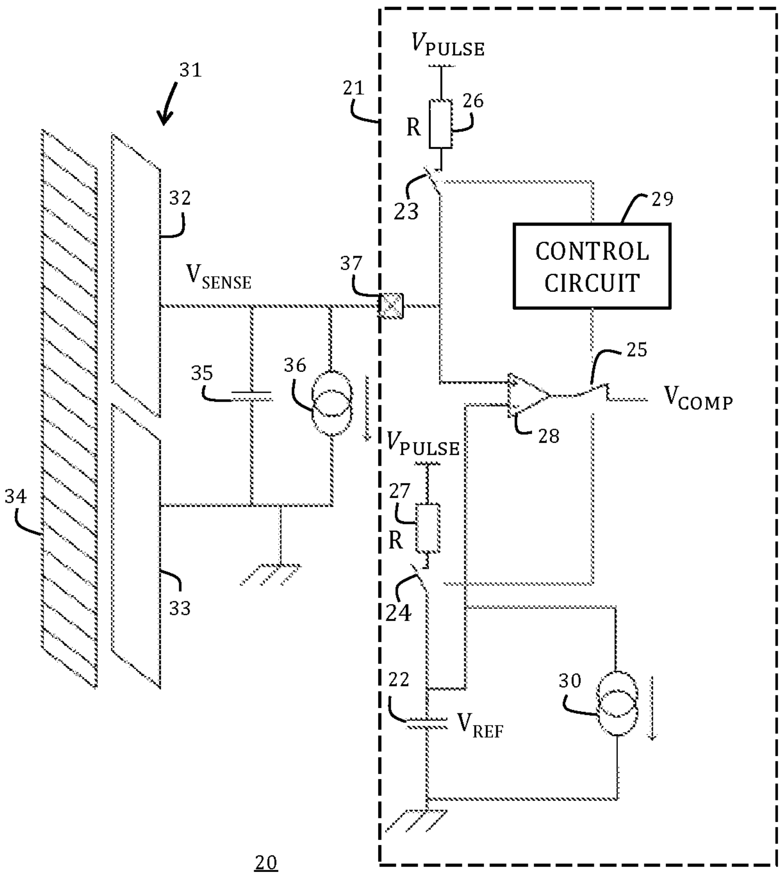
FIG. 3 illustrates a circuit diagram of an earbud detection circuit according to another embodiment.
Figure 5:
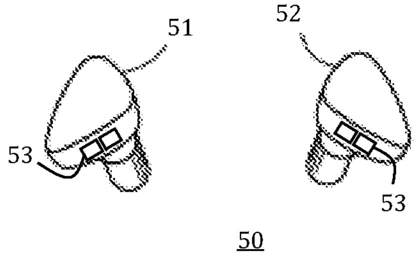
FIG. 5 illustrates a pair of earbuds suitable for use with the earbud detection circuits of FIG. 1, FIG. 3, and FIG. 4.

FIG. 3 illustrates a circuit diagram of earbud detection circuit 20 according to another embodiment. Like earbud detection circuit 10, earbud detection circuit 20 is implemented in an earbud, not a charging case. Earbud detection circuit 20 includes evaluation circuit 21, and sensing capacitive element 31. Evaluation circuit 21 includes reference capacitor 22, switches 23-25, resistors 26 and 27, comparator 28, and control circuit 29. Sensing capacitive element 31 includes conductive elements 32-34. In one embodiment, conductive elements 32 and 33 are metal sheets. The metal sheets are formed around a portion of an earbud housing in close proximity to each other so that a capacitance value can be measured between them. In one embodiment, conductive elements 32 and 33 are attached with an adhesive and coated with an insulating material. An example is illustrated in FIG. 5. The earbud housing is typically made of plastic and encloses the electronics and battery of the earbud. In one embodiment, conductive element 34 is the same type of material as conductive elements 32 and 33 and mounted to an inside surface of the charging case in a position that will align with conductive elements 32 and 33 when the earbud is inserted into the charging case. In another embodiment, conductive element 34 may be a different type of conducive material. Evaluation circuit 21 is connected to sensing capacitor conductive element 32 via a terminal 37. Conductive element 33 is connected to a ground terminal. Conductive element 34 functions to enhance the capacitance generated by conductive elements 32 and 33 and does not have an electrical connection to evaluation circuit 21. In some embodiments, external capacitor 35 may be included to increase the capacitance seen at terminal 37. Current sources 30 and 36 are included to illustrate an inherent leakage current that will cause the stored capacitance of capacitors 22 and 31 to decrease over time.

In one embodiment, evaluation circuit 21 is implemented in hardware on an integrated circuit mounted (IC) inside the earbud housing. Voltage source $V_{PULSE}$ is provided by the battery of the earbud. Evaluation circuit 21 operates in detection cycles that each has a charging phase and a sensing phase as described above regarding FIG. 1 and FIG. 2. During the charging phase, switches 23 and 24 are closed and switch 25 is opened by control circuit 29. Capacitors 22 and 31 are both charged to a high voltage through resistors 23 and 27 to a voltage equal to about $V_{PULSE}$. During the sensing phase, switches 23 and 24 open, and switch 25 closes. Comparator circuit 28 is active during the sensing phase. The voltage $V_{REF}$ of reference capacitor 22 and voltage $V_{SENSE}$ of sensing capacitive element 31 are provided to inputs of comparator 28. The output voltage $V_{COMP}$ from comparator 28 indicates the earbud is in the charging case if voltage $V_{SENSE}$ is greater than voltage $V_{REF}$. Likewise, the output voltage $V_{COMP}$ from comparator 28 indicates the earbud is out of the charging case if voltage $V_{REF}$ is greater than voltage $V_{SENSE}$.

Capacitive element 31 may be dimensioned so that capacitance $C_{ref}$ of reference capacitor 22 is larger than capacitance $C_{sense}$ of sensing capacitive element 31 when the earbud is outside the charging case, and so that capacitance $C_{ref}$ is lower than capacitance $C_{sense}$ when the earbud is within the charging case. Accordingly, the metal sheet mounted within the charging case is positioned to have an appropriate influence on the value of $C_{sense}$. For example, conductive element 34 may be positioned within the charging case so that it is parallel with the conductive elements 32 and 33 when the earbud is fully within the charging case. Furthermore, capacitance $C_{sense}$ may be adjusted by adding an additional external parallel capacitor 35. Alternatively, capacitive elements 22 and 31 may be dimensioned differently for efficiency reasons and the charging time of the capacitive elements may be trimmed by using different resistance values for resistors 26 and 27.

As discussed above, in response to the comparator 28 indicating the earbud is in the charging case, then communications circuits of the earbud are put in a standby mode to reduce power consumption. In another embodiment, the earbud is switched into standby mode a predetermined time period after determining the earbud is within the charging case and no communication with the charging case is detected.

Earbud detection circuit 20 provides a cost efficient and easy to implement way of detecting if an earbud is within a charging case. Earbud detection circuit 20 may be added to an existing device with minimal effort. No extra dedicated sensor system, e.g., a Hall sensor system, is required. The earbud detection circuit provides for low current consumption, for example, in one embodiment, 2.5 nano amperes (nA) root mean square (rms) with a 10 Hz detection cycle rate. Note that the time between capacitor charging phases and sensing phases can be adjusted to optimize the power consumption.

As an example current consumption calculation, assume that $C_{ref}$=1.5 pico Farad (pF), $C_{sense}$=2 pF, $V_{pulse}$=3 volts (V), and charging resistors 26 and 27 resistance R=50 mega ohms (MΩ). Also, assume a sensing cycle of 10 Hz, then $$I_{max}(C_{sense}) = \frac{V_{pulse}}{R} \cdot e^{-t=0/R \cdot C_{sense}} = 60 \text{ nA},$$

$$I_{rms}(C_{sense}) = 1.34 \text{ nA},$$

$$I_{rms}(C_{ref}) = 1.16 \text{ nA, and}$$

$$I_{rms} = 2.5 \text{ nA}.$$

Other embodiments may produce different results.

Figure 4:
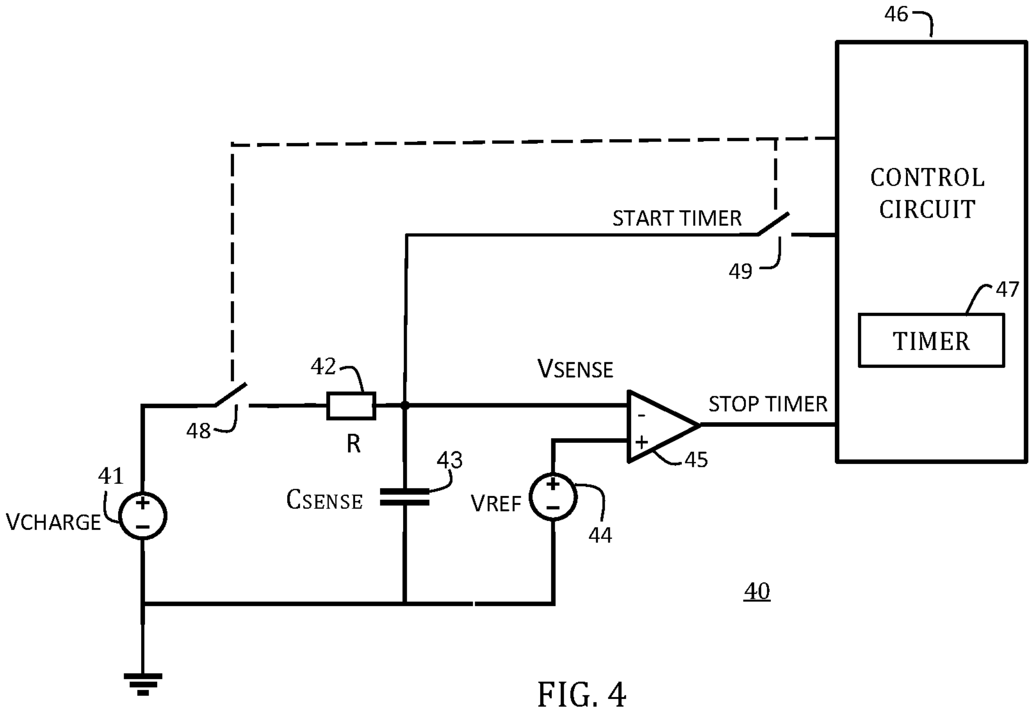
FIG. 4 illustrates a circuit diagram of an earbud detection circuit according to another embodiment.

FIG. 4 illustrates a conceptual circuit diagram of earbud detection circuit 40 in accordance with another embodiment. Earbud detection circuit 40 detects an earbud in a charging case by measuring the time a voltage across a sensing capacitor drops below a certain voltage threshold. This embodiment eliminates the use of a reference capacitor, but may require a more complex evaluation circuit. Earbud detection circuit 40 includes a voltage source 41, resistor 42, sensing capacitor 43, reference voltage source 44, comparator 45, control circuit 46, and switches 48 and 49. Control circuit 46 includes timer 47. Earbud detection circuit 40 is implemented similarly to capacitive element 31 of earbud detection circuit 40 with sensing capacitor 43 formed with two conductive elements mounted on the surface of an earbud and a third conductive element formed on the inside of the charging case. As discussed above, a detection cycle has a charging phase and a sensing phase. The charging phase begins with switch 48 closed and switch 49 open to charge sensing capacitor 43 from voltage source 41 through resistor 42. The sensing phase begins when switch 48 opens and switch 49 closes to provide a START TIMER signal to control circuit 46 to begin the discharge timing with timer 47. A measured time period between starting and stopping the timer is proportional to a capacitance value of sensing capacitor 43. When voltage $V_{SENSE}$ from sensing capacitor 43 drops below the reference voltage $V_{REF}$, a STOP TIMER signal is provided by comparator 45 to stop timer 47. If the measured time period is above a threshold, then the earbud is inside the charging case.

FIG. 5 illustrates pair of earbuds 50 suitable for use with the earbud detection circuits of FIG. 1, FIG. 3, and FIG. 4. Pair of earbuds 50 includes an earbud 51 and earbud 52. Conductive elements 53 of the sensing capacitor are provided as illustrated in FIG. 3 and may be mounted to the plastic housing of earbuds 50 in various ways, for example, metal sheets sized appropriately may be shaped to fit a curved surface of the earbud and attached with, for example, an adhesive in a location that can be aligned with a corresponding conductive element positioned in an earbud dock of the charging case that is shaped to fit the shape of the earbud (charging case not shown). Note that even through rectangular shaped conductive elements are shown, the conductive elements may have any shape and size to fit the particular shapes and sizes of the earbuds.

Figure 6:
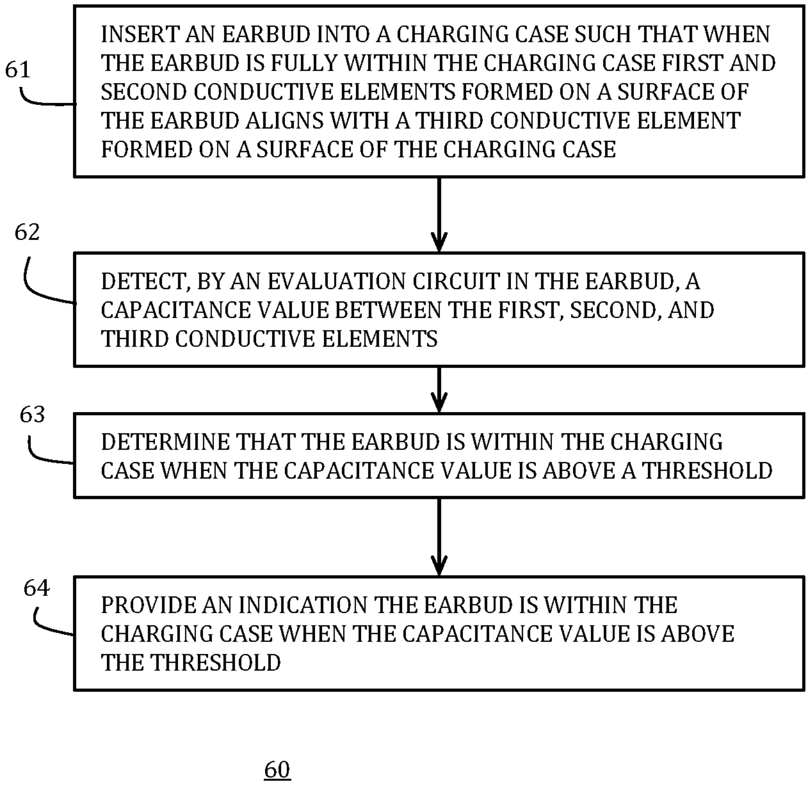
FIG. 6 illustrates a method for detection an earbud in a discharged earbud case according to an embodiment.

FIG. 6 illustrates method 60 for detecting an earbud in a discharged earbud case according to an embodiment. Method 60 begins at block 61. At block 61, an earbud is inserted into a charging case such that when the earbud is fully within the charging case first and second conductive elements formed on a surface of the earbud aligns with a third conductive element formed on a surface of the charging case. At block 62, an evaluation circuit in the earbud detects a capacitance value between the first, second, and third conductive elements. At block 63, it is determined that the earbud is in the charging case when the capacitance value is above a threshold. Note, that in one embodiment, a voltage level is used to represent the charged state of the first and second conductive elements. At block 64, an indication is provided that the earbud is within the charging case when the capacitance value is above the threshold.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. An earbud comprising:

an earbud housing;

first and second conductive elements mounted to a surface of the earbud housing configured to form a first capacitive element, wherein when the earbud is located within a charging case, the first and second conductive elements are arranged with a third conductive element mounted to the charging case in a location designed to influence a capacitance of the first and second conductive elements; and an evaluation circuit positioned within the earbud housing and electrically coupled to the first and second conductive elements, wherein in response to the first and second conductive elements having a capacitance value above a threshold, the evaluation circuit providing an indication the earbud is within the charging case.

2. The earbud of claim 1, wherein the first and second conductive elements are metallic sheets attached to the surface of the earbud housing.

3. The earbud of claim 1, wherein the first conductive element is selectively coupled to a supply voltage terminal, and the second conductive element is coupled to a ground terminal.

4. The earbud of claim 3, wherein the evaluation circuit comprises:
- a reference capacitor selectively coupled between the supply voltage terminal and the ground terminal; and
- a comparator having a first input coupled to the first capacitive element, a second input coupled to the reference capacitor, and an output for providing the indication the earbud is within the charging case in response to a voltage level representative of the capacitance value of the first capacitive element being greater than a voltage level representative of a capacitance value of the reference capacitor.

5. The earbud of claim 4, further comprising a control circuit configured to connect the first capacitive element and the reference capacitor to the supply voltage terminal during a charging phase of operation, and the control circuit configured to disconnect the first capacitive element and the reference capacitor from the supply voltage terminal during a sensing phase of operation.

6. The earbud of claim 1, wherein the third conductive element is formed in the charging case such that it is parallel with the first and second conductive elements when the earbud is positioned within the charging case.

7. The earbud of claim 1, wherein the evaluation circuit further comprises:
- a comparator having a first input coupled to the first capacitive element, a second input coupled to receive a reference voltage, and an output;
- a control circuit configured to couple the first capacitive element to a supply voltage terminal during a capacitor charging phase, and after the capacitor charging phase, to begin a capacitance sensing phase, wherein a timer is started at the beginning of the capacitance sensing phase, and the timer is stopped when a voltage of the first capacitive element drops below the reference voltage, wherein a measured time between starting and stopping the timer is proportional to a capacitance value of the first capacitive element, and wherein the measured time being above a threshold time provides an indication the earbud is within the charging case.

8. The earbud of claim 1, further comprising a resistor connected in series with the first capacitive element.

9. The earbud of claim 1, wherein a circuit of the earbud is switched into a standby mode in response to detecting the earbud is within the charging case and the battery is depleted.

10. A method for detecting an earbud is within a charging case, the method comprising:
- inserting the earbud into the charging case, wherein when the earbud is fully within the charging case first and second conductive elements formed on a surface of the earbud align with a third conductive element formed on a surface of the charging case;
- detecting, by an evaluation circuit in the earbud, a capacitance value between the first, second, and third conductive elements;
- determining that the earbud is within the charging case when the capacitance value is above a threshold; and
- providing an indication the earbud is within the charging case when the capacitance value is above the threshold.

11. The method of claim 10, further comprising switching the earbud into a standby mode in response to detecting the earbud is within the charging case and the battery is depleted.

12. The method of claim 10, further comprising switching the earbud into a standby mode a predetermined time after determining that the earbud is within the charging case and no communication with the charging case is detected.

13. The method of claim 10, wherein determining that the earbud is within the charging case further comprises determining that the earbud is within the charging case when the capacitance value of the first capacitive element is higher than a capacitance value of a reference capacitor.

14. The method of claim 10, further comprising:
- charging the first capacitive element during a charging phase;
- sensing a capacitance value of the first capacitive element during a sensing phase, the sensing phase following the charging phase; and
- measuring a time between starting the sensing phase and when a voltage across the first capacitive element drops below a reference voltage, wherein when the measured time is above a threshold time, an indication is provided that the earbud is within the charging case.

15. An integrated circuit comprising:
- a supply voltage terminal coupled to receive a supply voltage;
- a switch having a first terminal coupled to the supply voltage terminal, a second terminal, and a control terminal;
- a comparator having a first input terminal coupled to receive a reference voltage, a second input terminal coupled to a capacitive element formed from first and second conductive elements formed on a surface of an earbud housing, and the comparator having an output terminal, wherein the first and second conductive elements are aligned with a third conductive element formed on an inside of a charging case when the earbud is inserted into the charging case, and wherein the first conductive element is coupled to the second terminal of the switch, and the second conductive element is coupled to the ground terminal; and
- a control circuit coupled to the control terminal of the switch, wherein the control circuit causes the switch to close and charge the capacitive element during a charging phase, wherein the control circuit causes the switch to open during a sensing phase following the charging phase, and wherein, during the sensing phase, the output terminal of the comparator provides an indication the earbud is within the charging case when a voltage level of the capacitive element is above the reference voltage.

16. The integrated circuit of claim 15, wherein the reference voltage is provided by a reference capacitor formed on the integrated circuit.

17. The integrated circuit of claim 15, wherein the earbud is switched into a standby mode in response to detecting the earbud is within the charging case.

18. The integrated circuit of claim 15, wherein the control circuit further comprises a timer, wherein the timer is started at the beginning of the sensing phase, and the timer is stopped when a voltage at the capacitive element drops below the reference voltage, wherein a measured time between starting and stopping the timer is proportional to a capacitance value of the capacitive element, and wherein the measured time being above a threshold time provides an indication the earbud is inserted within the charging case.

19. The integrated circuit of claim 15, wherein the first, second, and third conductive elements are metallic sheets.

20. The integrated circuit of claim 15, further comprising an additional capacitor connected in parallel with the capacitive element external to the integrated circuit.

* * * * *